No. 630,495. Patented Aug. 8, 1899.
R. L. DUNN.
AIR COMPRESSOR.
(Application filed Nov. 19, 1898.)
(No Model.) 5 Sheets—Sheet 1.

Fig. 1

Witnesses
C. W. Fowler
Dwight Anderson

Inventor
Russell L. Dunn
by G. Walter Fowler
Attorney

No. 630,495. Patented Aug. 8, 1899.
R. L. DUNN.
AIR COMPRESSOR.
(Application filed Nov. 19, 1898.)
(No Model.) 5 Sheets—Sheet 4.

UNITED STATES PATENT OFFICE.

RUSSELL L. DUNN, OF SAN FRANCISCO, CALIFORNIA, ASSIGNOR OF THREE-FOURTHS TO CLARENCE STANLEY PRESTON AND FRANK HANFORD, OF SEATTLE, WASHINGTON.

AIR-COMPRESSOR.

SPECIFICATION forming part of Letters Patent No. 630,495, dated August 8, 1899.

Application filed November 19, 1898. Serial No. 696,873. (No model.)

*To all whom it may concern:*

Be it known that I, RUSSELL L. DUNN, a citizen of the United States, residing at San Francisco, in the county of San Francisco and State of California, have invented new and useful Improvements in Air-Compressors, of which the following is a specification.

The object of my invention is to economically and directly conserve into compressed air with a much greater economy than that obtained from hydraulic engines heretofore used the energy of a mass of water acting in a pipe under a gravity-head.

My invention consists in the parts and the constructions, arrangements, and combinations of parts hereinafter described and claimed whereby a mass of water acting in a motive-water pipe conserves a portion of its kinetic energy into compressed air and with the remainder forces the air so compressed into a suitable receiver.

In the operation of my apparatus I apply directly to a predetermined volume of air the predetermined kinetic energy of a mass of water acting in a pipe by its velocity-head, (the velocity-head being a determinate portion of the total or gravity head,) arranging structurally my machine to secure directly, with the lowest economic velocity-head, the energy just sufficient to compress the air to a desired tension and to transfer it so compressed into a suitable receiver, wasting in the operation only that volume of water which displaces the air compressed.

In the accompanying drawings, which form part of this specification and in which like letters and numerals of reference indicate corresponding parts.

In said drawings I have illustrated an apparatus both single and in series which I consider best suited for the purpose I have in view; but I do not limit myself to the precise actuating mechanisms and details of construction, as these may be varied within certain limits without materially modifying the broad feature of my invention, which resides in the employment of several connected parts in such determinate structural proportion, relation, and adjustment of one to each and all the others that a mass of water acting in one of the parts, which I term the "motive-water pipe," will generate a determinate amount of kinetic energy, which it subsequently in another part, which I term the "compression-chamber," partially conserves by compressing to a predetermined tension a volume of air and completely uses up in transferring the compressed air and its conserved energy to a receiver.

Figures 4, 10, 11, 12:
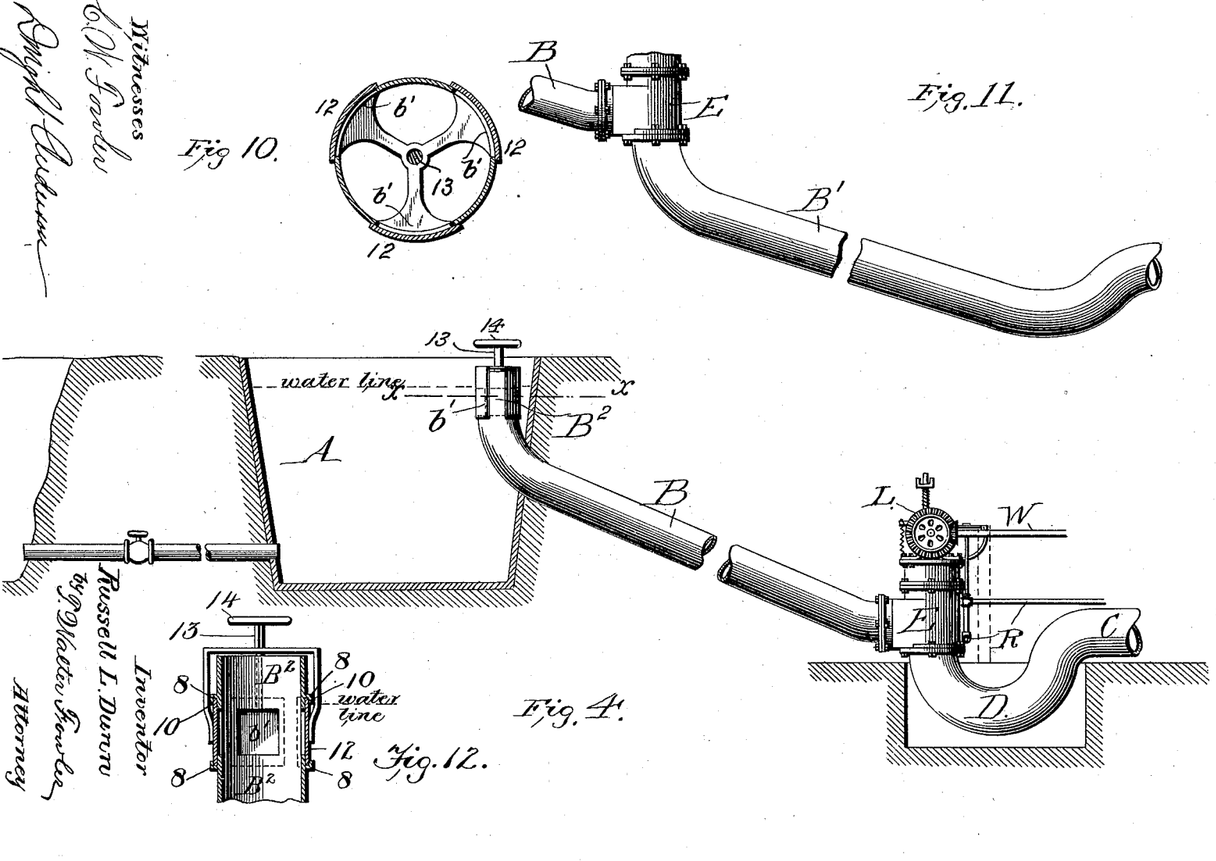
Fig. 4 represents the motive-water pipe with its supplying-reservoir, adjusting device, &c.
Fig. 10 is an enlarged section on line $x\,x$ of Fig. 4.
Fig. 11 is an elevation showing an alternative location of the inlet-valve on the motive-water pipe.
Fig. 12 is a vertical section of the adjusting device shown on Fig. 4.
Figure 5:
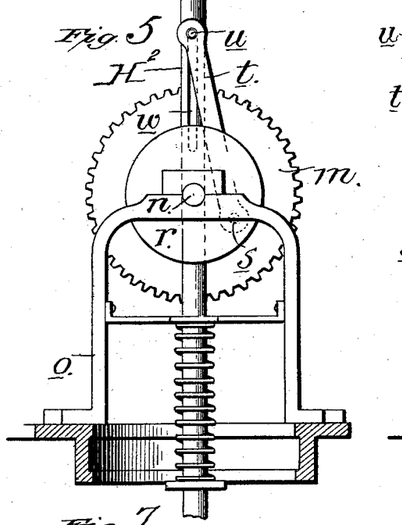
Fig. 5 is an enlarged detail, part in section and part side elevation, showing the means for operating the waste-water valve or outlet-valve.
Figure 6:
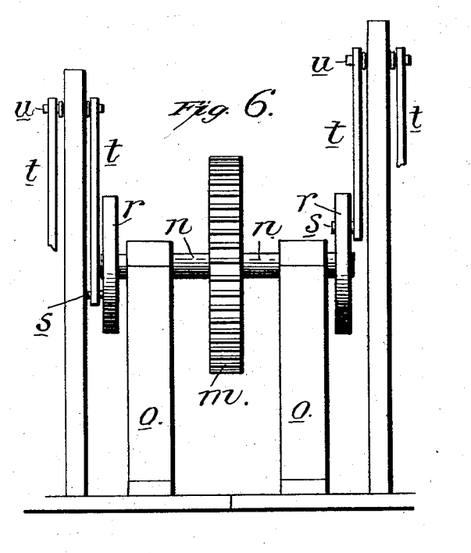
Fig. 6 is a rear elevation of Fig. 5.
Figure 7:
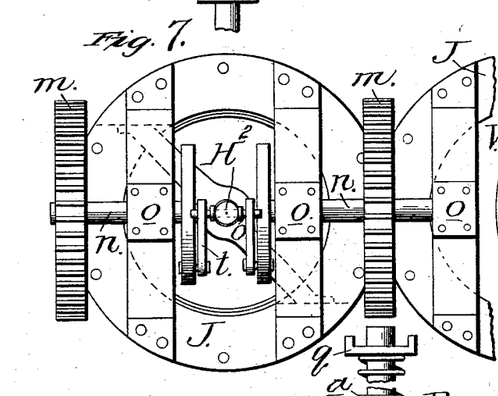
Fig. 7 is a plan view of Fig. 5.
Figure 8:
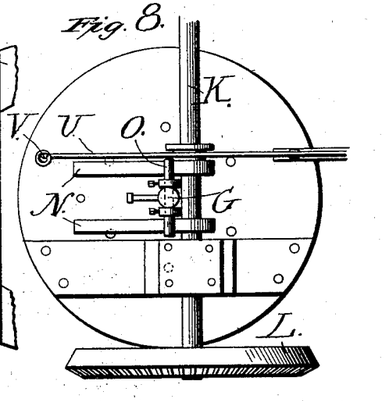
Fig. 8 is a plan view showing the mechanism for operating the water-inlet valve and a valve which admits a water-spray to the air in the compression-chambers.

The apparatus shown in the accompanying drawings is to be used in connection with a reservoir A, Fig. 4, containing water maintained with a quiet surface at a constant level from any suitable source.

B is the motive-water pipe fed from the reservoir A, having by preference disposition in a true straight grade-line from its connection with the compression-chamber to a point not more than its entry-head below the water-surface in the reservoir, about ten (10) inches submergence being sufficient.

The function of the motive-water pipe B, Fig. 4, is the generation within it by a mass of water in the water-column acting by its velocity-head of a determinate quantity of kinetic energy. The diameter of this water-column is the same as the diameter of the inlet-valve F to the compresssion-chamber C. The base of this water-column and lower limitation of the generation of energy in the motive-water pipe is the horizontal plane of the top of the horizontal portion of the compression-chamber C. The superior limit of the column is the surface plane of the water in the reservoir end of the pipe. The motive-water pipe is the pipe containing this water-column. The determinate structural relations and disposition of the motive-water pipe to the other parts of the apparatus are its diameter equal to or slightly exceeding the diameter of the compression-chamber C, its length such that it will contain a determinate column of water, the mass of which, acting by its velocity-head, shall generate the determinate kinetic energy required, and its preferable disposition in a straight grade-line in the vertical plane of the compression-chamber C and the trap D from the inlet-valve to a point in the reservoir not farther below the surface of the water than the required entry-head of the water-supply.

In order to have a convenient disposition for a flow-adjusting device, I turn the pipe vertically upward in the reservoir from a point about ten (10) inches below the surface. Turned upward at that point the vertical portion $B^2$ of the pipe should be extended a few inches above the quiet surface of the reservoir-water.

$b'$ $b'$ are slots made in the pipe extending from the water-surface to the depth of the turn, said slots being of uniform width and uniformly spaced to admit water from the reservoir A. Around the slotted end of the pipe B two (2) rings 8 8 are placed one above and the other below the slots $b'$ $b'$, the surfaces between the rings being turned true and smooth to make a close joint. The rings 8 8 are cut away at 10 to form annular slots or guides, and in these slide shutters 12 of uniform width, one for each slot, and having their inner surface true and smooth. A stem 13 is fitted to the shutters 12 in any appropriate manner and is provided with a handle or handpiece 14, by which the shutters 12 are operated. These shutters are designed to close the water entirely out of the pipe B when desired and to adjust the rate of the flow of the water into said pipe when necessary.

Other forms or arrangements may be employed to adjust the water-supply without affecting the scope of my invention; but the one hereinabove described is well suited for my purposes.

As will particularly appear in this specification, the valve-actuating mechanism operates the valves successively, so that there is an interval of time in which the inlet water-valve is open, during which time interval the motor-water column is acting and water is moving downward into the compression-chamber, and successively to this time interval a second interval of time during which the inlet water-valve is closed (being the time interval in which the outlet water-valve is open and discharging the compression-chamber of water and replacing it with air) and the water in the motor-column is at rest. The action and flow of the water in the motive-water pipe B is thus intermittent, and inasmuch as it receives its water-supply through the adjusting device I have described I adjust this supply either that the pipe shall receive its full supply (the amount withdrawn each forward movement into the compression-chamber) during the time interval of the forward movement or so that it shall only receive the proportion of the full amount of supply that the time interval of action in the motive-water pipe bears to the total time interval between successive openings of the inlet-valve. I can also adjust the supply-water entry into the pipe at any point between these limits. The effect of this adjustment is on the motor-column of water in the motive-water pipe, which is given thereby a different length and a correspondingly-different velocity-head, thereby generating a different determinate amount of kinetic energy and conserving energy in compressed air of a different tension, or in the ordinary operation of the engine the different determinate amount of kinetic energy generated compensates for natural changes in atmospheric temperature, thereby conserving energy at a constant tension. The adjustment is also used to compensate for differences in frictional resistances in operation from those anticipated by calculation. The advantage of this method of adjustment is its economy of water wastes or of structure, or of both.

Figure 3:
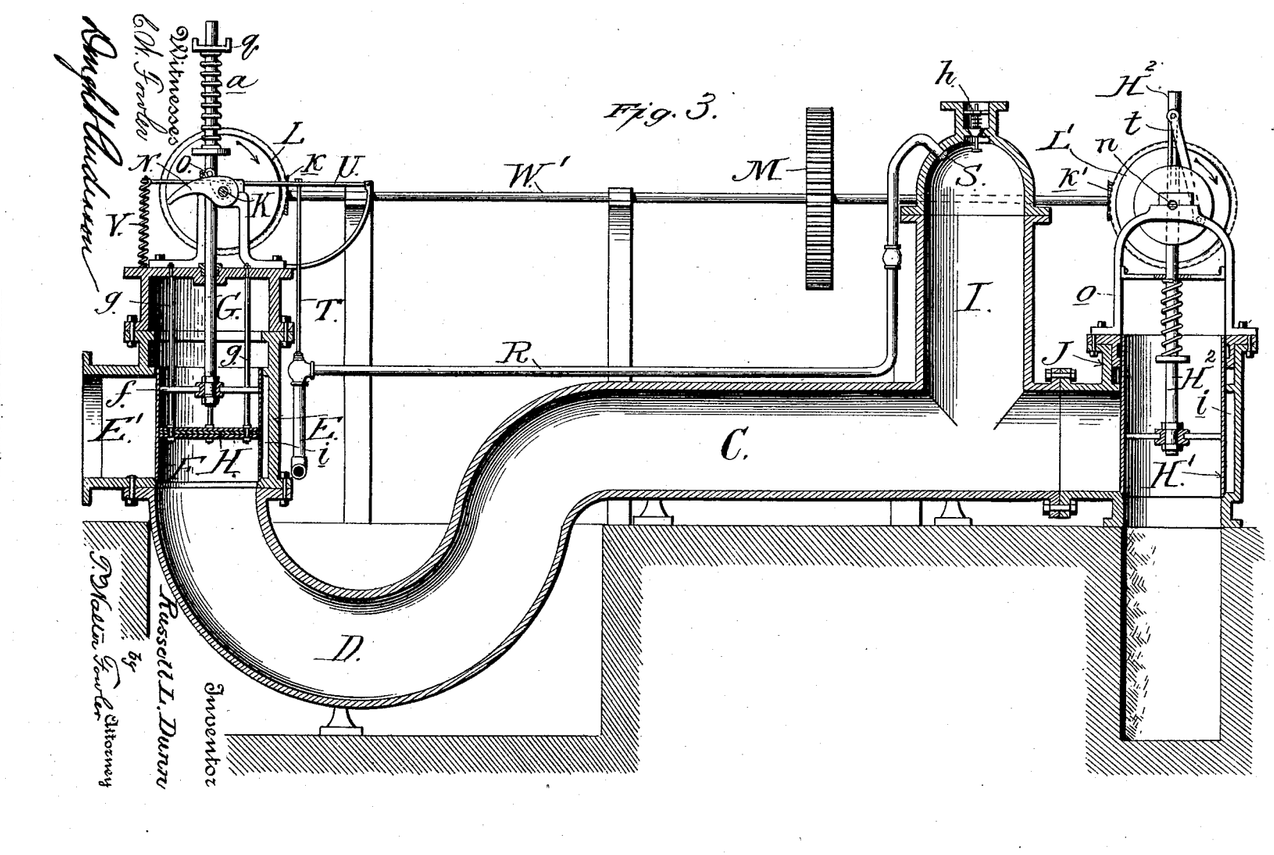
Fig. 3 shows a longitudinal sectional view of a single compression-chamber.

C, Fig. 3, is a compression-chamber of the same or slightly less diameter than the motive-water pipe B, into which enter alternately free air to be compressed and the volume of water from the motive-water pipe B, which displaces it after compression.

The chamber C is disposed horizontally in order to get the greater economy of applied force. It is constructed with a vertical portion I, into which the compressed air collects and from which it is forced out through the air-valve $h$ into any suitable receiver. This vertical portion I is near the end of the chamber C and is structurally of such dimensions that with substantially the same diameter as the horizontal part of C its cubic capacity shall be about that of the volume of air when compressed to the required tension, the object of this structure being to avoid possible losses of the air after compression by reason of inclosure in the water at points in an all horizontally-disposed chamber of air that the movement of the water would not get to the air-outlet valve before it closed by reason of the cessation of forward motion of the water.

The compression-chamber C at its outlet end terminates in a casing J, in which the cylindrical valve H' operates vertically. H' is a hollow cylindrical valve, the details of which are shown in Fig. 3. This valve is surrounded by a chamber $i$ in the casing J, and is thus balanced against the pressure of the water which surrounds it on every side and is kept firmly to its seat by a spring. A downward opening in the valve-casing J under the valve H' when the latter is open permits the water in the compression-chamber to be discharged or wasted and the free air to enter in its place, this valve having thereby a dual function.

D is a water-trap which is designed to remain filled with water during the operation of the machine, its function being a dual one—first, to prevent the backflow of air when it is being compressed, and, second, to form a seal between the inlet-valve F and the compression-chamber C, so that when the inlet-valve is opened the water shall move forward as a piston instead of as a spray.

F, Fig. 3, is a hollow cylindrical valve operated vertically, affording a water-inlet from the pipe B to the compression-chamber C, balanced against the water-pressure by a chamber $i$ in a valve-casing E. The inlet-opening E' of the valve-casing E and its opening downward into the trap D are of the same diameter as that of the compression-chamber C. The static pressure of the water from the pipe B is carried in the valve F by a piston H, over which the valve slides, the piston H being held in place by studs $g$ $g$.

The inlet water-valve F in its casing E, I have described as constructed between the trap D and the lower end of the motive-water pipe B. I have, however, an alternative construction by which the inlet-valve F and its casing E may be set at or near the upper end of the motive-water pipe B, as shown by B', Fig. 11, but only on the condition, however, that the vertical height of the valve above the horizontal plane of the bottom of the compression-chamber C shall not be as much as the height at which the atmospheric pressure would sustain a water-column against a vacuum. I prefer the arrangement that I have first described in detail.

I do not claim the details of construction of the valves as part of my invention, nor do I confine myself to these particular styles of valve, but have described them as being well adapted for use in the operation of my invention, nor do I limit myself to the specific means of actuating the valves, which I prefer, however, to accomplish as follows: Suitably journaled across opposite ends of the apparatus are shafts K K', and upon the opposite ends of these shafts are fixed bevel-gears L L', which gears are designed to mesh with pinions $k$ $k'$ on the opposite ends of the shafts W W', which are disposed at right angles to the shafts K K' and parallel with and above the compressing-chambers.

Figure 1:
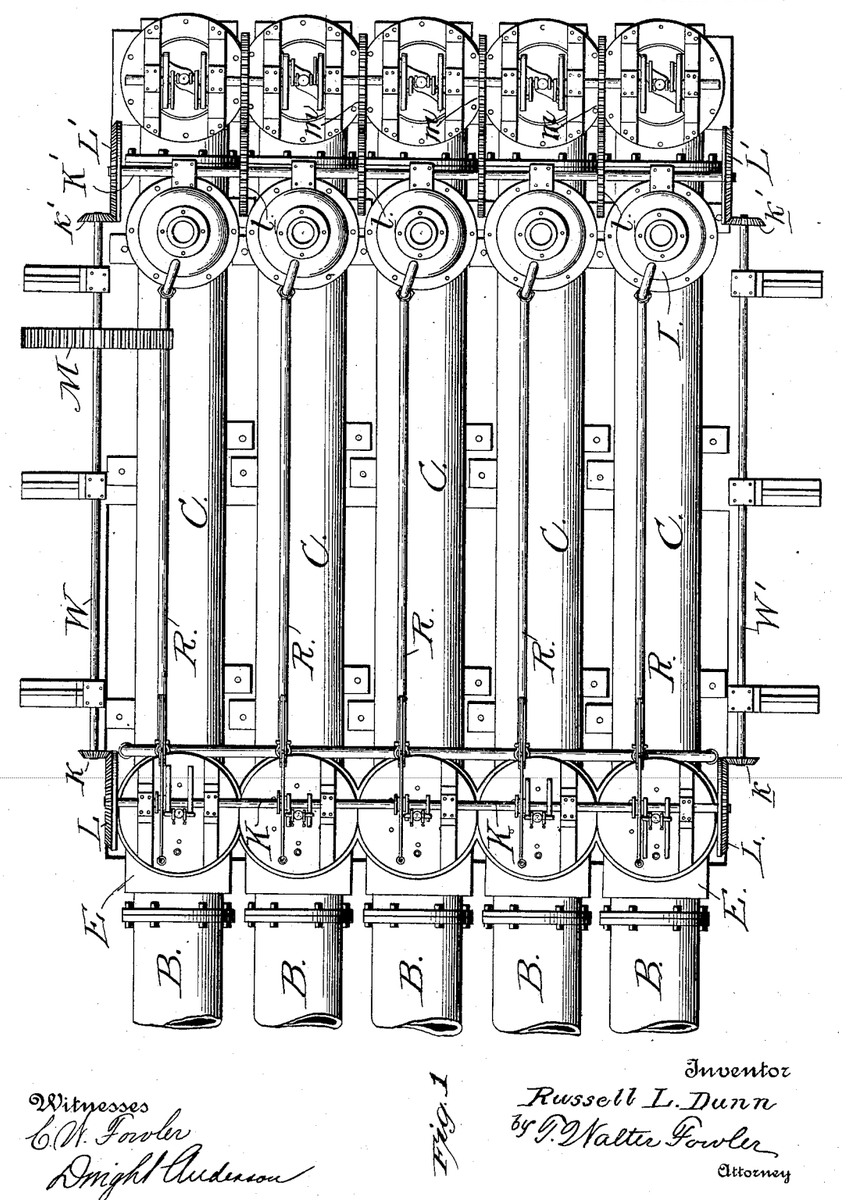
Figure 1 represents a plan view of a series or battery of compression-chambers and valve-operating mechanism, illustrating my invention.
Figure 2:
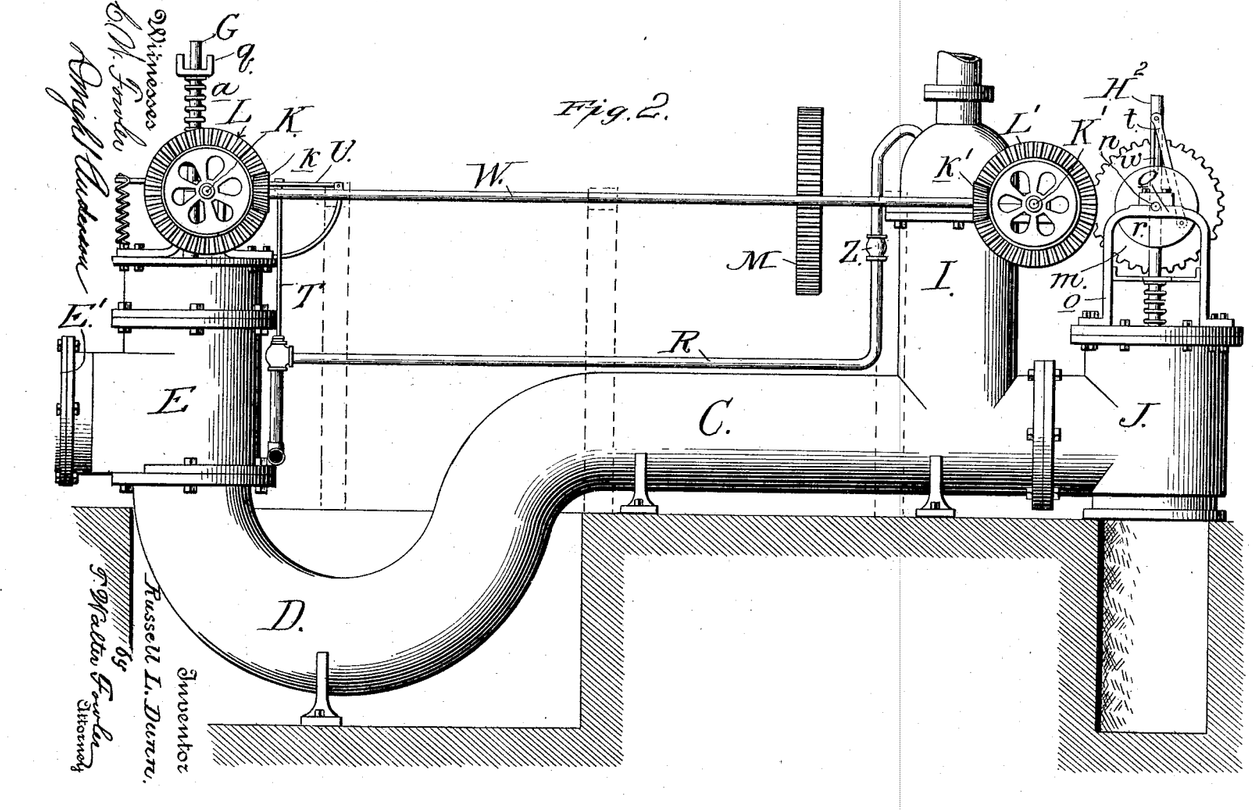
Fig. 2 is a side elevation of Fig. 1.

When using a series or battery of compression-chambers, I arrange the parts as shown in Figs. 1 and 2, in which case the shaft K' is disposed between the valve-stem of the discharge-valve and the air-collector I, and said shaft has fixed to it spurs $l$, which mesh with similar gears $m$ on short stud-shafts $n$, suitably journaled in supports $o$, rising from the caps of the valve-casings of the discharge-valves; but when using a single cylinder type of apparatus, as shown in Fig. 3, the shaft K' is dispensed with, also its spur-gears, and the bevel-gear L' is secured directly to one of the short shafts $n$, as shown in Fig. 3, and the pinion $k'$ made to directly engage said bevel-gear.

When operating a single apparatus not in series, the shafts W W' are arranged upon opposite sides of the cylinder, just as they are shown upon opposite sides of the battery or series of cylinders in Fig. 1, and the power to drive the several shafts and gears is derived from any suitable secondary engine operated by the compressed air or other energy, transmitted to a driving-gear M on one of the aforesaid shafts W W'. Upon the shaft K are keyed cams N, each having a long gradually-increasing cam-surface and round point, and passing transversely through the stem G of the water-inlet valve F is a pin O, which while close-fitting is capable of an axial movement in its bearing, the ends of this pin being extended so that they lie upon the curved surface of the cam, and as said cam lifts, because of the rotation of the shaft which carries it, the pin O will turn in its bearings, thereby producing substantially an antifriction or roller bearing for the cam-surface, and at the same time truly center the lifting energy on the valve-stem. Above the pin the valve-stem is provided with a collar P, and between this collar and an angle-iron $q$ of some fixed framework a spring $a$ is placed, whereby the instant the pin O escapes the end of the cams the said spring accelerates the return of the inlet-valve to its seat. The short stud-shaft $n$ for a discharge-valve H' is lined with the stem H², and the adjacent ends of companion shafts $n$ carry disks $r$ with crank-pins $s$, to which the lower ends of links $t$ are connected, the upper ends of these links being provided with pins $u$, working in a vertical slot $w$, cut through the valve-stem H².

The function of the valve-actuating device described is also dual. First, it actuates the valves F and H' successively, so that when the inlet-valve F is open the outlet-valve H' is closed, and when the valve H' is open the valve F is closed, and, second, the combination of cams N and disks $r$, with their appurtenant connections and gears, are so contrived that the substantially exact time interval of action of the water in the motive-water pipe B during which the valve F is required to be open plus the different but substantially exact time interval of water wasting through the valve H' shall be the substantially exact time interval of one full revolution of the shafts K and n, so that in the continuous operation of the engine there is no avoidable loss of time.

Figure 9:
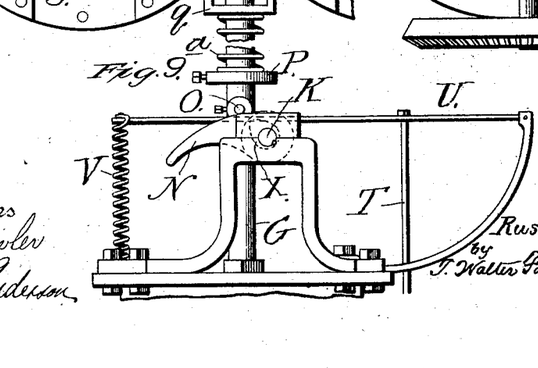
Fig. 9 is a side elevation of Fig. 8.

When compressing to a high degree of compression, I propose to inject a water-spray into the compressed air. Thus I show a water-pipe R, Fig. 3, leading to the upper portion of the compression-chamber C and provided with a rose or sprinkler S, adapted to discharge a spray into the compression-chamber. This water-pipe may be provided with any well-known and appropriate form of valve, and the stem T, Fig. 9, of this valve is connected with a rod or arm U, fulcrumed at one end and having its opposite end connected with a spring V, and on the shaft K, I secure an eccentric X, which rides up under the arm U, raising the latter and opening the valve in the spray-pipe, the spring V closing the valve after the point of the eccentric passes the arm. To prevent back pressure of air in the spray-pipe, I employ any well-known form of check-valve at Z. I also employ the spray in connection with the motive-water-pipe-inlet-adjusting device to compensate for natural changes in the atmosphere temperature.

The operation of the apparatus is substantially as follows: The trap D and the motive-water pipe B being filled with water and the compression-chamber C containing free air, the waste-valve H' being seated and the air-valve h being also closed, the movement of the secondary engine is commenced to operate the cams on the shaft K. The cams engage the pin O and lift the valve-stem G of the inlet-valve F, and thus open this valve. The mass of water in the motive-water pipe is thus released and free to act and immediately moves with the initial velocity determined by its velocity-head, thereby developing its entire kinetic energy, and there being no dead-space it gives this motion and energy instantly to the water in the trap D, the whole mass then moving toward and commencing to enter the compression-chamber C, opposed only by the initial resistance of the air at atmospheric tension in C. As the forward movement continues the resistance of the air increases by its compression and correspondingly the mass of water in the motive-water pipe loses its initial velocity, having transferred kinetic energy to the air. The air as compression proceeds is pressed out of the horizontal portion of the compression-chamber into the vertical portion I and when compressed substantially to the predetermined degree of tension the air-valve h opens and the compressed air passes through it into the receiver. The mass of water moving into the vertical portion I has continued to lose its initial velocity and to use up its kinetic energy until at the completion of the air expulsion it has lost all of its velocity and kinetic energy. At this instant the air-valve h is closed by the back pressure of the air from the receiver. The inlet-valve F, which has previously been released by the cams passing from under the pins O and impelled in the reverse direction toward its seat by the spring A, is seated, and successively to the seating of this inlet-valve the secondary engine, continuing to work the shafts n, revolving the disks r, raises the links t and by them the pin u in the slot w in the valve-stem H², until at this successive instant the pin u engages the upper end of the slot w and lifts with it the valve-stem H² and the waste-valve H'. Out of this waste-valve the water in the compression-chamber empties, and its place in the compression-chamber is taken by free air. The continued operation of the secondary engine seats the waste-valve H' the instant the water is fully discharged and at that same instant has so far revolved the cams N N that in the next successive instant they shall engage the pin O, thus restoring that initial condition described, from which the operation is repeated.

In this specification I use the word "determinate" as expressing "exact description by lines, surfaces, and volumes" and as expressing "exact measurement by concrete numbers," and I use the word "indeterminate" as expressing the opposite of "determinate."

The herein-described hydraulic air-compressor differs from the known prior art in that in my invention the water-pipe is not considered simply as a conduit for water from a source of supply to a point where pressure is applied or power is generated, but is, contrary to this, considered, primarily, as a determinative structural feature of the apparatus for a determinative generative purpose. It is considered and constructed as being a vessel within which as the function of the determinate structural elements—diameter, length, and disposition—water acting in it by a determinate velocity-head develops a particular determinate kinetic energy—the prime mover of the engine. It is because of this that I term the pipe in my engine the "motive-water" pipe.

My invention also differs from the known prior art in that in the latter when the indeterminately-applied prime-mover energy is insufficient for the determinate work for which the engine is designed either devices are employed by which the compression-chamber is adjusted to have a less volume or the volume of its free-air content is diminished by allowing a portion of it to escape in the beginning of each compression; or devices are employed to waste the surplus when the indeterminately-applied prime-mover energy exceeds the determinate work for which the engine is designed. In my invention no such devices are required or used, the object of the devices being more economically obtained by the structure and disposition of the motive-water pipe and by the adjustment of the determinate as distinguished from indeterminate prime-mover energy by a device controlling the inflow of water into the motive-water pipe. Otherwise expressed, in the known prior art operative adjustment is made in or at the work end of the apparatus, either reducing the work with or without waste of water or by wasting the prime-mover energy, while in my invention operative adjustment, ordinarily as a result of structure and disposition entirely unnecessary, is when required effected at the prime-mover end of the apparatus, thereby maintaining the work of the engine at its maximum and wasting neither water nor energy.

My invention further differs from the known prior art in that in the latter the prime-mover energy is indeterminate energy, while in my invention the prime-mover energy is determinate kinetic energy.

The indifferent disposition and structure of a compression-chamber, the adjusting devices necessary to and connected with it, the notably indifferent structure or indifferent disposition of the pipe, or both, and the consideration of it as primarily a water-supply conduit and pressure-provider, the dependence for prime-mover energy on the total head of the water and its pressure rather than on a mass of motive water and its motion, and the generally preferred use of high total heads of water rather than on the use of low heads as sources of prime-mover energy are common conditions found in the known prior art.

The particular disposition and structure of a compression-chamber, the absence of adjusting attachments to it, and absence of the cause of them, the particular structure and disposition of a pipe and its primary consideration as a motive-power-generating vessel rather than as a water-conduit and pressure-provider, the dependence for prime-mover energy on a mass of motive water and its motion rather than on the total head of water and its pressure, and the preferred use of low total heads of water rather than high heads as sources of prime-mover energy are the important improvements of this art in my invention and as well its distinguishing differences from the known prior art.

In my invention I plan and dispose a pipe, which I term the "motive-water pipe," for the express purpose of enabling the water while confined and acting within it to most economically generate and transmit determinate kinetic energy. I plan and dispose an adjusting device at the inlet end of the motive-water pipe for the express purpose of effecting a determinate regulation of the amount of generated kinetic energy to changes of engine-load. I plan and dispose a horizontal compression-chamber for the express purpose of enabling air by compression in it to conserve the greatest possible proportion of generated kinetic energy. I plan and dispose a trap at the inlet end of this compression-chamber and a vertical portion of the compression-chamber near the outlet for the express purpose of preventing escape of air from the compression-chamber through the inlet-valve and of preventing inclusion of air in the water and its escape through the outlet-valve. I plan and dispose a valve-actuating mechanism for the express purpose of preventing avoidable loss of time.

Herein—to wit, in the addition to the known prior art of a heretofore unknown element the determinate kinetic energy of water confined in a pipe acting by a gravity-head and its determinate structural application in a novel and useful apparatus—resides the essence of my invention.

Having thus described my invention, what I claim as new, and desire to secure by Letters Patent, is—

1. In a hydraulic air-compressor, the combination of a horizontally-disposed compression-chamber, valves controlling the water inlet and outlet of said chamber, means for operating the valves successively, and an inclined motive-water pipe connecting above with a source of water-supply and below with the inlet end of the compression-chamber whereby the water acting in it by gravity develops the kinetic energy required.

2. In a hydraulic air-compressor, a horizontal compression-chamber having a minor vertical member at or near the outlet end adapted to contain substantially the air volume after compression, valves controlling the water inlet and outlet ends of said chamber, means for operating the valves successively, and an inclined motive-water pipe connecting above with a source of water-supply and below with the inlet end of the compression-chamber whereby the water acting in it by gravity develops the kinetic energy required.

3. In a hydraulic air-compressor, a compression-chamber horizontally disposed and having a trap at its inlet end said chamber having a vertical minor member at or near its outlet end and adapted to contain substantially the air volume after compression, valves controlling the water inlet and outlet of said chamber, means for operating the valves successively, and a motive-water pipe connecting above with a source of water-supply and below with the inlet of the compression-chamber whereby the water acting in it by gravity develops the kinetic energy required.

4. In a hydraulic air-compressor, a compression-chamber horizontally disposed, having a trap at its inlet end and having a vertical member at its outlet end adapted to contain substantially the air volume after compression, water inlet and outlet valves and means for operating the same successively, a pipe for the motive water connecting above with a source of water-supply and below with the inlet end of said chamber, and means for regulating the amount of water supplied to said pipe and thereby adjusting the kinetic energy developed to the amount of compression required.

5. A hydraulic air-compressor including a compression-chamber having water inlet and outlet valves and means whereby said valves are operated successively, a motive-water pipe connecting an elevated source of water-supply with the inlet end of said chamber, and means controlling the entrance of water to said pipe whereby the amount of kinetic energy developed may be adjusted by regulating the amount of water acting in the motive-water pipe.

6. A hydraulic air-compressor including a horizontally-disposed compression-chamber having a vertical minor member at or near its outlet end adapted to contain substantially the air volume after compression, water inlet and outlet valves at opposite ends of the chamber and means whereby said valves are operated successively, an inclined motive-water pipe connecting above with a source of water-supply and below with the inlet end of the chamber whereby the water acting in it by gravity develops the kinetic energy required, and means controlling the entrance of water to said pipe whereby the amount of kinetic energy developed may be adjusted by regulating the amount of water acting in the motive-water pipe.

7. A hydraulic air-compressor including a horizontal compression-chamber having a vertical member at or near one end adapted to contain substantially the air volume after compression, and a trap at the opposite end, water inlet and outlet valves and means whereby they are successively operated, an inclined motive-water pipe having one end connecting with a source of water-supply and the opposite end connecting with the inlet to the chamber, and means controlling the entrance of water to said pipe whereby the amount of kinetic energy developed may be adjusted by regulating the amount of water acting in the motive-water pipe.

8. In a hydraulic air-compressor, the combination of a motive-water pipe, connecting above with a source of water-supply, and connecting below with the casing of an inlet water-valve whereby the water acting in it by gravity develops the kinetic energy required, a compression-chamber horizontally disposed, a water-trap at the inlet end of the compression-chamber, a vertical extension of the compression-chamber near the outlet end adapted to contain substantially the air volume after compression; an inlet water-valve between the motive-water pipe and the water-trap, an outlet waste-water-discharge valve from the compression-chamber, adapted, also, to admit air to the chamber, a compressed-air-outlet valve, valve-operating mechanism for operating the inlet and outlet water-valves successively and continuously, and means controlling the entrance of water to said pipe whereby the amount of kinetic energy developed may be adjusted by regulating the amount of water acting in the motive-water pipe.

In testimony whereof I have hereunto set my hand in presence of two subscribing witnesses.

RUSSELL L. DUNN.

Witnesses:
S. A. TERRY,
CHAPMAN W. FOWLER.